March 4, 1924.
F. W. MEYER
1,485,865
CONTROL AND REGULATION OF ENERGY CONVERSION MACHINES
Filed Feb. 12, 1920
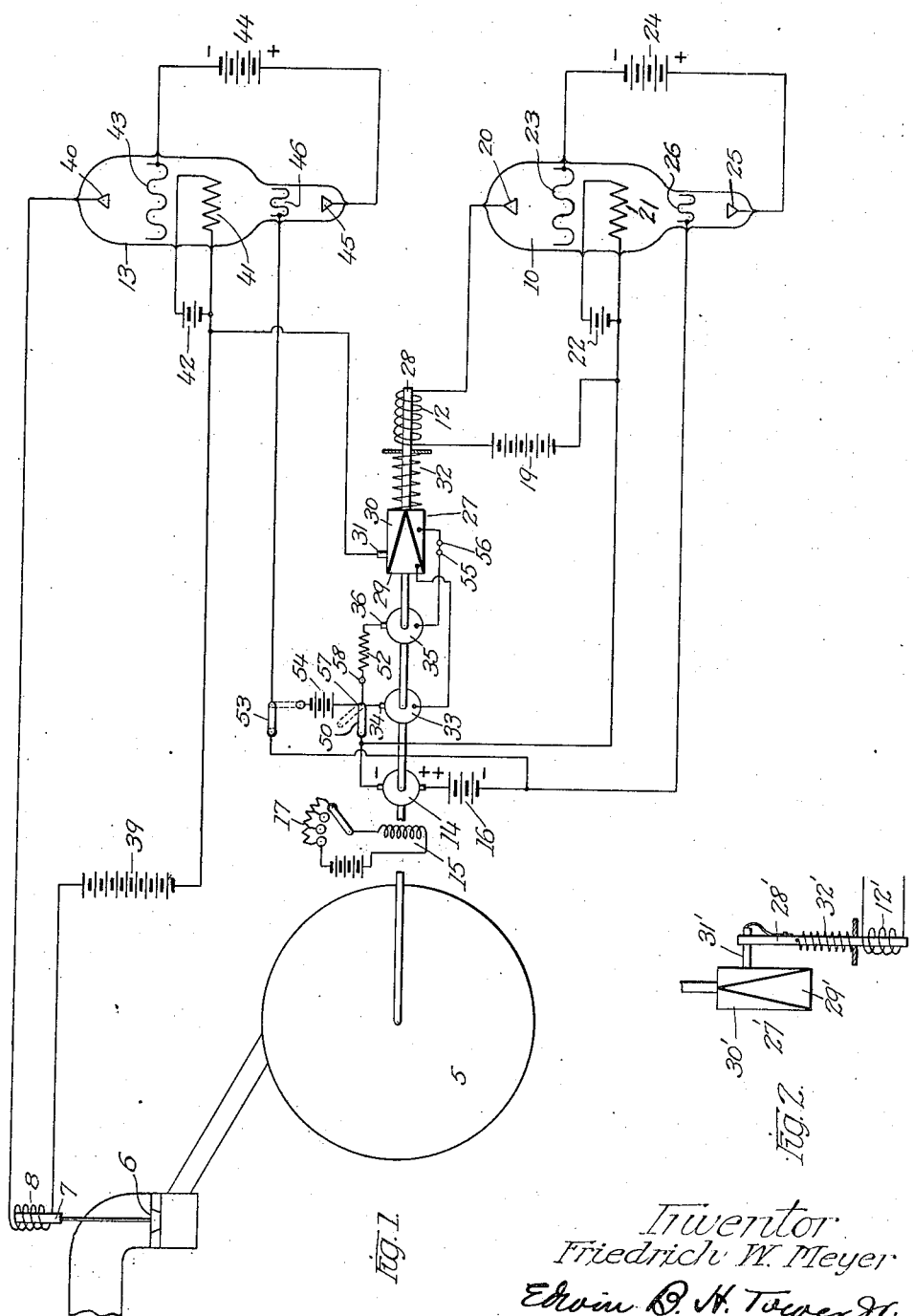

Patented Mar. 4, 1924.

1,485,865

UNITED STATES PATENT OFFICE.

FRIEDRICH WILHELM MEYER, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROL AND REGULATION OF ENERGY-CONVERSION MACHINES.

Application filed February 12, 1920. Serial No. 358,101.

*To all whom it may concern:*

Be it known that I, FRIEDRICH WILHELM MEYER, a citizen of Germany, residing at Milwaukee, in the county of Milwaukee and State of Wisconsin, have invented new and useful Improvements in Control and Regulation of Energy-Conversion Machines, of which the following is a specification.

This invention relates to the control and regulation of energy conversion machines.

It relates more particularly to the control and regulation of machines which convert the energy in a fluid into kinetic energy and which are subject to varying speed, load and power conditions.

Heretofore when controlling and regulating machines which convert the energy in a fluid into kinetic energy, mechanical governors responsive to changes in speed, load and power conditions have been employed for controlling or governing the operation of the valves controlling the supply of energy admitted to the machines. Inasmuch as such governors possess inertia a delay or lag results between the occurrence of a change in such conditions and the inauguration of the regulating effect to compensate therefor. Furthermore, in systems employing comparatively sensitive mechanical governors undesirable oscillation takes place. Such methods of control and regulation are therefore productive of unstable operation, overrunning and hunting, or inefficiency due to the energy consumed.

One of the objects of this invention is to produce more sensitive, stable and efficient regulation by improved means for controlling the duration and magnitude of the energy supply periods.

Another object is to provide improved regulating means which will respond to slight variations in operating conditions and accurately compensate therefor by varying the duration of the energy supply periods.

Another object is to provide improved means for controlling work circuits.

Another object is to produce sharply defined controlling effects in a work circuit carrying appreciable currents.

Another object is to produce amplified controlling effects in a work circuit by relay apparatus whose controlling circuit carries practically no current.

Other objects and advantages will appear from the description and claims.

The accompanying drawings diagrammatically show embodiments of the invention, but it is to be understood that these are merely for the purpose of illustration and that many other embodiments may be made and will readily occur to those skilled in the art.

In the drawings:

Figure 1 illustrates a system for controlling and regulating a steam turbine by varying the duration and magnitude of the energy supply periods thereof; and Fig. 2 illustrates a modification of a portion of the control apparatus.

Fig. 1 will first be described.

A steam turbine 5 is controlled by a pulsating admission valve 6. The valve 6 is controlled and operated by an electromagnet comprising a plunger 7 and a magnet coil 8. A spring may be provided to close the valve or the pressure of the steam may be utilized for this purpose. The steam is admitted in a series of puffs whose duration and magnitude are controlled by electroionic means. The electroionic means comprise electroionic valves 10 and 13 each of which is coincidently responsive to the varying speed, load and power conditions to which the turbine is subject. An electromagnet having a coil 12 controlled by the electroionic valve 10 cooperates with the electroionic valve 13 in the control of the energy supplied to the turbine.

The electroionic valves respond instantaneously to a change in speed of the turbine. The electroionic valve 13 controls the valve operating magnet to vary the magnitude of the valve opening. The electroionic valve 10 controls the cooperating magnet coil 12 to vary the closure of the contact controlled thereby whereby through the electroionic valve 13, the duration of the valve opening and therefore of the energy supply periods is increased or decreased.

A small direct current generator or tachometer machine 14 is connected to the shaft of the turbine to be driven thereby and thus the voltage of the tachometer machine is a direct measure of the speed of the turbine. The tachometer machine has a separately excited field 15 which may be varied at will by a rheostat 17. The tachometer machine being driven as it is directly by the shaft of the turbine to be controlled and having no motion of its own, injects into the system no mechanical inertia affecting the regulation and control. The armature of the tachometer is connected with the electroionic valve 10. The electroionic valve 10 is of the type disclosed in my co-pending application Serial No, 284,249, filed March 22, 1919. It will be understood, however, that any other suitable well known type of electroionic valve may be employed in place of the one shown. This electroionic valve comprises a vessel which may be evacuated to any desired degree or filled with a gas; as for example, mercury vapor or argon. This gas may be and preferably is at low pressure. Within the vessel are arranged a main anode 20 and a cathode 21. Cathode 21 is heated to a glowing condition by current from a suitable source such as a battery 22 which is connected to its opposite terminals. The anode 20 is connected to one terminal of the magnet coil 12 whose other terminal is connected through a battery 19 with one end of the cathode 21 whereby the energization of the magnet coil 12 is directly controlled by the electroionic valve 10.

Positioned between the anode 20 and cathode 21 is an auxiliary electrode 23 which may take the form of a grid. Grid 23 is connected to the negative terminal of a battery 24, the opposite terminal of which is connected to an auxiliary electrode 25 located in the vessel near the end opposite the main anode 20. A second auxiliary electrode 26 which may also take the form of a grid is positioned between electrode 25 and the cathode 21. The effect of the electroionic valve 10 is primarily controlled by the tachometer machine 14. The ends of the cathode 21 and the grid 26 are connected with the control circuit, or as it may be termed, the sensitive circuit, which includes the armature of the tachometer machine 14 and an opposing battery 16.

The battery 16 normally predominates so as to maintain negative potentials on the grids 26 and 46.

Changes in the voltage impressed upon the grid 26 through the sensitive circuit influence the auxiliary discharge between the cathode 21 and the anode 25. This influence upon the auxiliary discharge in turn causes a change in the voltage impressed upon the grid 23 by the battery 24. Such changes in the potential of grid 23 influence the main discharge between cathode 21 and the main anode 20, thereby varying the potential impressed on the coil 12. The relay effect upon the main discharge is the product of the effects of the two grid systems upon the auxiliary and main discharges.

The magnet coil 12 acts upon a plunger or core 28 one end of which is attached to a contact drum 27. This contact drum 27 is mounted upon the turbine shaft and rotates therewith, but is free to slide thereon. The contact drum 27 is provided with a segmental contact face 29 with which a contact brush 31 cooperates. The drum may also be provided with a second contact face 30 insulated from the contact face 29. The contact brush 31 may also cooperate with the contact face 30. The brush 31 is of sufficient width to bridge the insulation between the contact faces, so that one face engages the brush before the other moves out of engagement therewith. A spring 32 normally maintains the drum 27 in a predetermined longitudinal position with respect to the brush 31. The relative position of the drum 27 and the brush 31 may be varied by the action of the electromagnet. If the pull of the magnet coil 12 increases, the plunger 28 is drawn within the coil moving the drum to the right. The duration of contact between the brush 31 and the segmental face 29 during each revolution of the drum is thereby increased. A decrease in pull of the magnet coil 12 upon the plunger 28 produces the opposite effect; that is, the duration of engagement of the brush 31 with the contact face 29 during each revolution of the drum is decreased.

The segmental contact face 29 is electrically connected with a collector ring 33 connected with and rotated by the turbine shaft. A contact brush 34 cooperates with the collector ring 33. When the contact face 30 is employed it is electrically connected with a collector ring 35 having a cooperating contact brush 36. This collector ring 35 is also connected with and driven by the turbine shaft.

The electroionic valve 13 may be preferably of construction similar to that of the valve 10 aforedescribed. Moreover, similar elements in the two devices are designated by corresponding reference numerals upon the drawings. Also since the structure of the valve per se forms no part of the present invention such structure is deemed to warrant no further description herein.

It should, however, be noted that the main circuit between anode 40 and cathode 41 of valve 13 includes the electromagnet coil 8 and battery 39 whereas the sensitive circuit of grid 46 and cathode 41 of said valve 13 includes the tachometer machine 14 and battery 16 as in the valve 10. The ends of the cathode 41 and the grid 46 are connected with the control circuit of the electroionic valve 13. This control circuit may be traced from the positive terminal of battery 16 through the armature circuit of the tachometer machine 14, switch 50, brush 34, collector ring 33, contact face 29, contact brush 31, cathode 41, grid 46, and switch 53 to the negative terminal of battery 16. This control circuit is rendered intermittently effective due to the rotation of the contact drum 27.

Referring to Fig. 1, the operation of the controller may be described as follows. During inaction of the turbine 5 or when acting, so long as the contacting drum 27 and its brush 31 are in substantially the relation illustrated, it is apparent that no appreciable energy is transmitted by either of the valves 10 and 13 since in each the potentials tending to cause discharge are checked or opposed by negative grid potentials, whereby the controller is inactive.

However, assuming the turbine to be in operation it is apparent that during that portion of each rotative cycle wherein brush 31 is in contact with the drum section 29 the auxiliary grid or sensitive circuits of the valves 10 and 13 are completed through the tachometer machine 14 and battery 16, and since as aforestated the voltages of said devices oppose one another it is apparent that the negative potentials of said individual grids 46 and 26 are reduced by an amount proportional to the voltage generated by the tachometer machine at the instant speed of the turbine.

As a result of such reduction in negative potential of the auxiliary grids of the two valves a current is permitted to flow momentarily in the main grid circuit of each valve whereby the negative potential of each of grids 23 and 43 with reference to its associated cathode is reduced thus permitting a flow of current between the main anode and cathode of each valve, whereby coils 8 and 12 become energized and valve 6 and plunger 28 are consequently actuated to degrees which are directly proportional to the value of the voltage developed by the tachometer machine 14.

Thus the valve 6 is opened periodically through recurrent engagement of brush 31 and drum segment 29 which engagement occurs at a frequency directly proportional to the speed of the turbine, whereas the extent of such opening is in each instance controllable by the instantaneous voltage of the tachometer machine 14 as a result of action of the electroionic valve 13.

Also, since the degree of energization of coil 12 serves in conjunction with the action of spring 32 to determine the instantaneous axial position of the contacting drum 27 with reference to the brush 31, the length of time during each revolution of the drum within which said brush 31 is in contact with the drum segment 29, and hence the duration of the period within which the valve 6 is maintained open in each instance, is controllable in accordance with instantaneous values of the voltage of tachometer machine 14 through action of the electroionic valve 10.

Here it may be noted that the action of the electroionic valve 13 for varying the extent of opening of valve 6 will precede the action of the electroionic valve 10 for varying the duration of each period within which the valve 6 is opened, since the electromagnet 12 must respond and shift the position of the contact drum 27 before a change in duration of the period wherein the valve is open can be effected.

Since as aforestated the contacting drum 27 and slip rings 33 and 35 rotate with the turbine shaft, and during a portion of each revolution, the control circuit of the electroionic valve 13 is closed while the brush 31 is in engagement with the segmental contact face 29. The duration of this engagement while the turbine is operating at a certain speed and under certain load and power conditions may not vary. The magnet 8 controlled by the electroionic valve 13 causes the opening and closing of the valve 6, but the duration of the axial opening remains constant so long as the relation of the brush 31 and the contact drum 27 does not change.

If the turbine speed decreases, less voltage is generated by the tachometer machine. The battery 16 will therefore predominate to a greater extent, thereby decreasing the negative potenial of the grids 26 and 46 of the electroionic valves 10 and 13. The electroionic valve 13 thereupon causes an increased voltage to be impressed upon the magnet coil 8. The magnet thereupon causes an increase in the magnitude of the valve opening. The electroionic valve 10 also causes an increased voltage to be impressed upon the magnet coil 12. The contact drum 27 is thereupon moved to the right against the action of the spring 32. The duration of engagement of the brush 31 and segment 29 is thereby increased. The electroionic valve 13 will therefore cause an increased voltage to be impressed upon the magnet coil 8 for a greater length of time. Both the duration and magnitude of the valve opening are thereby increased, whereby more power is admitted to the turbine to compensate for the decrease in speed. If the turbine speed increases, the control and regulating apparatus functions to produce the opposite effect—namely a decrease in both magnitude and duration of the opening of the valve.

By employing an adjustable moving contact which determines the duration of opening of the valve, the duration of the energy supply or admission periods and the duration of the expansion periods are controlled. Very highly efficient operation of the turbine is thereby obtained.

The use of an electroionic valve such as 13 in whose control circuit is connected the adjustable moving contact prevents trouble from burning or sparking of the contacts. This electroionic valve need not have any relay action except when it also controls the magnitude of the valve opening.

The automatic adjustment of the moving contact device 27 may, of course, be dispensed with, and the adjustment made by hand to take care of varying load conditions. For example, during hours of light load the moving contact may be adjusted so that the duration of its closure is relatively short, while for hours of heavy load the contact may be adjusted so that the duration of its closure is relatively long.

When the automatic adjustment of the moving contact is not desired, the electromagnet 12 and the electroionic valve 10 need not be employed. The automatic control and regulation of the magnitude of valve opening is however obtained, whereby the beneficial effects thereof are realized.

When automatic adjustment of the moving contact is employed, the electroionic valve 10 produces magnified controlling effects upon the electromagnet 12.

The control exerted by a grid upon the discharge between an anode and a cathode of an electroionic valve may be either positive or negative, since the grid potentials may either increase or decrease the space charge about the cathode and thus either hinder or promote the discharge.

Thus an electroionic valve is under positive control when positive potentials are maintained on its grid, and it is under negative control when negative potentials are maintained on its grid or grids. Further description of such controls may be found in Patents 1,353,815 and 1,369,457 to F. W. Meyer.

If negative control of the electroionic valves is employed no current flows in the control circuit of the electroionic valves 10 and 13. There will therefore be no destructive sparking between the contact brush 31 and the contact face 29 in the control circuit of the valve 13. If positive control of the electroionic valves is employed a very small amount of current will flow in the control circuits thereof, and it may therefore be desirable to protect the contact brush 31 and the contact face 29 in the control circuit of the valve 13, although this protection is not always necessary. A very high resistance 52 connected between the contact brushes 34 and 36 affords the necessary protection. This resistance is sufficiently high so that when included in the control circuit by the engagement of the contact brush 31 with the contact face 30 of the drum 27, the pull of the magnet coil 8 is greatly reduced to allow the valve 6 to close. Due to the width of the contact brush 31, the control circuit of the electroionic valve 13 is never opened but the resistance thereof is merely increased and decreased during each rotation of the contact drum 27.

It may at times be desirable to control merely the duration and not the magnitude of the valve opening. This may be accomplished by moving the switches 50 and 53 to their dotted line positions, which includes a source of current, such as a battery 54, in the control circuit in place of the armature circuit of the tachometer machine 14 and the battery 16. The voltage impressed upon the control electrodes of the electroionic valve 13 during each engagement of the brush 31 and the segment 29 will therefore be that of the battery 54.

If the contact protecting resistance 52 is not to be employed, the connections between terminals 55 and 56 and between terminals 57 and 58 are severed. The contact face 30 of the drum 27, the collector ring 35 and the resistance 52 are thereby removed from the control circuit of the electroionic valve 13.

Figure 2 shows another way of varying the relative position of the contact brush and the segmental contact face of the drum. The drum 27' is fixed to the turbine shaft while the contact brush 31' is carried by the plunger 28' which is moved by the pulling action of the magnet coil 12'. The spring 32' normally maintains the contact brush and drum in predetermined relative position. The position of the drum upon the turbine shaft is reversed so that an increase in pull by the magnet coil increases the duration of engagement between the contact brush 31' and contact face 29'.

Since the control circuit of the electroionic valve carries no appreciable current, there is no arcing at the contact in this circuit when the contact is opened. Therefore very sharply defined controlling effects may be produced in the main circuit of the electroionic valve which main circuit may carry comparatively heavy currents.

An important advantage of the system described is the cooperation of the two control and regulative effects. The varying of the duration of the valve opening insures high economy while the varying of the magnitude of the valve opening, accomplished without assistance of any apparatus having moving masses independent of the machine being regulated, insures high sensitiveness and speed of regulation, regardless of rate of change in operating condition. Thus a highly efficient system of control and regulation is produced.

It will be understood that the types of apparatus shown and described in connection with the control and regulation of the energy conversion machine are merely for the purpose of illustration and that other well known forms of such apparatus may be employed.

What is claimed is:

1. In a controller for prime movers to be supplied with motive agent intermittently within supply periods whose frequency is definitely related to the speed of the prime mover, the combination with means for controlling instantaneous values of the supply of motive agent, of electroionic means for controlling the duration of individual supply periods.

2. In a controller for prime movers to be supplied with motive agent intermittently within supply periods whose frequency is definitely related to the speed of the prime mover, the combination with electroionic means for controlling instantaneous values of the supply of motive agent of associated means for controlling the duration of individual supply periods.

3. In a controller for prime movers, the combination with means for throttling the supply of motive agent to the prime mover, of control means to act upon said former means for effecting an intermittent supply of motive agent within periods whose frequency is definitely timed with reference to the speed of the prime mover, and associated electroionic means for controlling instantaneous values of the motive agent supply.

4. In a controller for prime movers, the combination with means for immediately controlling the supply of motive agent to the prime mover, of control means to act upon said former means for effecting an intermittent supply of motive agent within periods whose frequency is definitely timed with reference to the speed of the prime mover, and associated electroionic means for controlling the duration of individual supply periods.

5. In a controller for prime movers, the combination with means for immediately controlling the supply of motive agent to the prime mover, of control means to act upon said former means for effecting an intermittent supply of motive agent within periods whose frequency is definitely timed with reference to the speed of the prime mover, and associated electroionic means for controlling instantaneous values of the motive agent supply and also for controlling the duration of individual supply periods.

6. In a controller for prime movers, the combination with means for immediately controlling the supply of motive agent to the prime mover, of control means to act upon said former means for effecting an intermittent supply of motive agent and for definitely timing the frequency of the supply periods with reference to the speed of the prime mover, and associated electroionic means subjected to influence of speed variations of the prime mover for controlling instantaneous values of the motive agent supply to compensate for such speed variations.

7. In a controller for prime movers, the combination with means for immediately controlling the supply of motive agent to the prime mover, of control means to act upon said former means for effecting an intermittent supply of motive agent and for definitely timing the frequency of the supply periods with reference to the speed of the prime mover, and associated electroionic means subjected to influence of speed variations of the prime mover for controlling the duration of individual supply periods to compensate for such speed variations.

8. In a controller for prime movers, the combination with means for immediately controlling the supply of motive agent to the prime mover, of control means to act upon said former means for effecting an intermittent supply of motive agent and for definitely timing the frequency of the supply periods with reference to the speed of the prime mover, and associated electroionic means subjected to influence of speed variations of the prime mover for controlling instantaneous values of the motive agent supply and also for controlling the duration of individual supply periods to thereby compensate for such speed variations.

9. In a controller for prime movers, the combination with means for immediately controlling the supply of motive agent to the prime mover, of control means to act upon said former means for effecting an intermittent supply of motive agent and for definitely timing the frequency of the supply periods with reference to the speed of the prime mover, and associated electroionic means subjected to influence of speed variations of the prime mover for controlling instantaneous values of the motive agent supply and also for independently controlling the duration of individual supply periods to thereby compensate for such speed variations.

10. In the control of prime movers to be supplied with motive agent intermittently at a definite frequency which is a function of the speed of the prime mover, the method which comprises electroionic control of instantaneous values of the motive agent supply.

11. In the control of prime movers to be supplied with motive agent intermittently at a definite frequency which is a function of the speed of the prime mover, the method which comprises electroionic control of the duration of individual periods of supply of the motive agent.

12. In the control of prime movers to be supplied with motive agent intermittently at a definite frequency which is a function of the speed of the prime mover, the method which comprises controlling electroionically the instantaneous values of the supply of motive agent and concurrently controlling the duration of the individual supply periods.

13. In the control of prime movers to be supplied with motive agent intermittently at a definite frequency which is a function of the speed of the prime mover, the method which comprises controlling the instantaneous values of the supply of motive agent and concurrently controlling electroionically the duration of the individual supply periods.

14. In the control of prime movers to be supplied with motive agent intermittently at a definite frequency which is a function of the speed of the prime mover, the method which comprises controlling electroionically the instantaneous values of the supply of motive agent and concurrently controlling electroionically the duration of the individual supply periods.

In witness whereof, I have hereunto subscribed my name.

FRIEDRICH WILHELM MEYER.